United States Patent [19]
Ohtani

[11] Patent Number: 5,707,555
[45] Date of Patent: Jan. 13, 1998

[54] CONDUCTIVE PASTE AND EXTERNAL ELECTRODES FOR ELECTRONIC PRODUCT FORMED USING SAME

[75] Inventor: Akira Ohtani, Shiga-ken, Japan

[73] Assignee: Murata Manufacturing Co., Ltd., Kyoto-fu, Japan

[21] Appl. No.: 560,296

[22] Filed: Nov. 17, 1995

[30] Foreign Application Priority Data

Nov. 24, 1994 [JP] Japan ................... 6-290079

[51] Int. Cl.$^6$ ................ H01B 1/16; H01G 4/20; H01M 4/62
[52] U.S. Cl. .............. 252/514; 361/320; 361/321.3; 428/689; 429/217; 429/232
[58] Field of Search .................. 252/512, 513, 252/514; 361/320, 321.3, 321.4; 428/689, 929; 429/217, 218, 232

[56] References Cited

U.S. PATENT DOCUMENTS 4,075,681  2/1978  Popowich ................ 361/305
4,937,016  6/1990  Suehiro et al. ........... 252/512
5,198,154  3/1993  Yokoyama et al. ......... 252/514
5,376,596  12/1994  Tokuda et al. ............ 501/19
5,474,711  12/1995  Borland et al. ........... 252/518

FOREIGN PATENT DOCUMENTS 239411    2/1990   Japan .
4293213   10/1992  Japan .
6309921   11/1994  Japan .
6349313   12/1994  Japan .

*Primary Examiner*—Douglas J. MiGinty
*Assistant Examiner*—Mark Kopec
*Attorney, Agent, or Firm*—Ostrolenk, Faber, Gerb & Soffen, LLP

[57] ABSTRACT

A conductive paste which can control formation of a reaction layer and allow large flexibility measurements, and external electrodes for an electronic product formed using this conductive paste are provided. The conductive paste is prepared by dispersing a metal powder and glass frit in an organic vehicle, and the glass frit is a mixture of a zinc group frit and a lead group frit, the percentage of zinc group frit being within a range of from about 20 to 80 wt %, while the lead group frit is the remainder.

6 Claims, 1 Drawing Sheet

CONDUCTIVE PASTE AND EXTERNAL ELECTRODES FOR ELECTRONIC PRODUCT FORMED USING SAME

BACKGROUND OF THE INVENTION

1. Field of the Invention

The present invention relates to a conductive paste and external electrodes for an electronic product formed using this conductive paste, and in particular to the composition of a glass frit.

2. Description of the Background Art

As one example of an electronic product in the prior art for which external electrodes have been constructed, a laminated ceramic capacitor (hereafter referred to as capacitor) is known having the structure shown in FIG. 1. Namely, the capacitor 10 comprises a capacitor main body 13 in which a dielectric ceramic layer 11 and internal electrodes 12 are stacked alternately and fired, and external electrodes 14 which conduct to the internal electrodes 12 are formed at both ends of the capacitor main body 13.

Also, when forming these external electrodes 14, generally, after producing a conductive paste by dispersing a metal powder which can be silver (Ag) powder, palladium (Pd) powder or a mixture thereof and a low melting point glass frit in an organic vehicle, the paste is adhered by a method of such as dipping both ends of the capacitor main body 13 in the conductive paste, and then baking it.

In such a conductive paste, the metal powder in the conductive paste is a conductive component, and the glass frit facilitates the adhesion of the external electrodes 14 with respect to the capacitor main body 13 which comprises a ceramic.

Also, the organic vehicle is one in which a resin component such as ethyl cellulose or acrylic, i.e. a resin component for controlling adhesives with respect to the ends of the capacitor main body 13, is dissolved by a solvent such as terpineol, butyl cellulose solvent, or the like.

As the glass frit for producing the conductive paste, zinc borosilicate glass, lead borosilicate glass, bismuth borosilicate glass, etc. are normally used. However, where external electrodes 14 comprising a conductive paste which includes only zinc borosilicate frit as the glass frit, such as in the case of zinc borosilicate glass is formed, as a result of a phenomenal reaction occurring between the ceramic which composes the capacitor main body 13 and the frit, a reaction layer 15 is formed between the capacitor main body 13 and the external electrodes 14. Also, when such a reaction layer 15 is formed, the mechanic strength, in particular the allowable flexibility measurements of the capacitor 10, i.e. the electronic product, are reduced.

SUMMARY OF THE INVENTION

The present invention has been proposed in light of such defects and has as its object to provide a conductive paste which can control formation of a reaction layer and allow large flexibility measurements, and external electrodes for an electronic product formed using this conductive paste.

The conductive paste of the present invention is prepared by dispersing a metal powder and glass frit in an organic vehicle, wherein the glass frit is a mixture of a zinc group frit and a lead group frit, the percentage of zinc group frit in the mixture being within the range of from about 20 to 80 wt %, and the lead group frit being the remainder.

Also, the external electrodes for an electronic product of the present invention is formed using the conductive paste, including the glass frit which is a mixture of a zinc group frit within the range of from about 20 to 80 wt % and lead group frit.

According to the conductive paste and external electrodes for electronic products of the present invention, the effects of suppressing formation of a reaction layer between the main body of the product and the external electrodes and increasing the flexibility measurement indicating the product characteristics of the electronic product, can be attained.

BRIEF DESCRIPTION OF THE DRAWINGS

These and other features, aspects and advantages of the present invention will become better understood with reference to the following description, appended claims and accompanying drawings wherein

DETAILED DESCRIPTION OF EMBODIMENTS OF THE INVENTION

Figure 1:
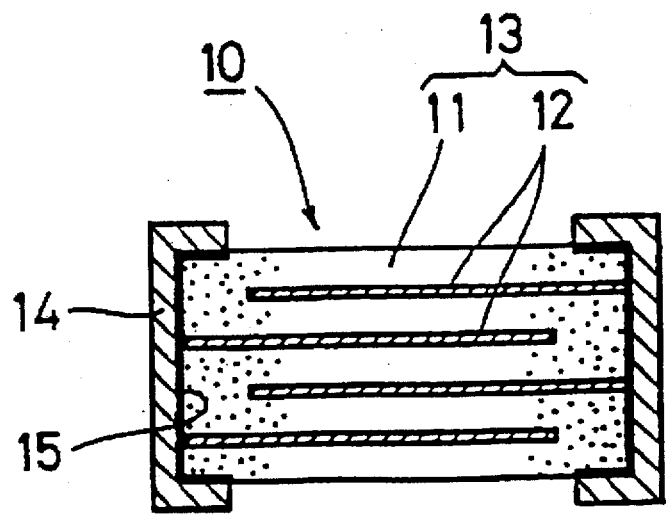
FIG. 1 is a structural cross section view showing in simplified form the capacitor according to the prior art.
Figure 2:
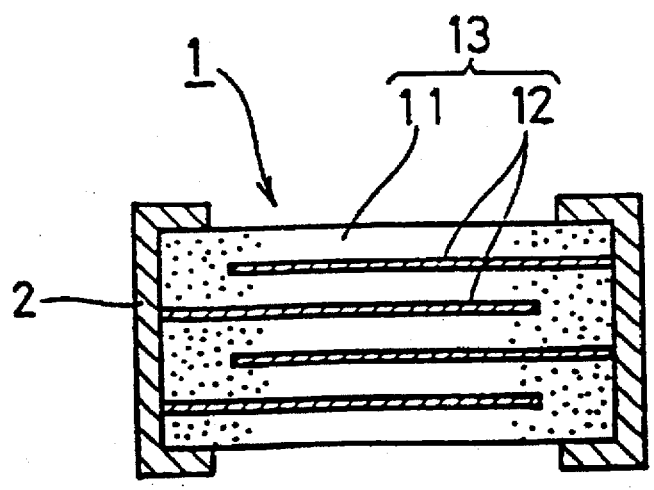
FIG. 2 is a structural cross section view showing in simplified form the capacitor according to the present invention.

Hereunder, an embodiment of the present invention will be explained. FIG. 2 is a structural cross sectional view showing, in simplified form, a capacitor 1 as an electronic product according to the present embodiment. The capacitor 1 has a main body 13 and external electrodes 2 formed on the sides of the capacitor main body 13. The capacitor main body 13 includes dielectric ceramic layers 11 and internal electrodes 12 alternately stacked with each other. Note that other than that related to the formation materials of the external electrodes 2 and the overall structure of the capacitor according to the present embodiment, the products do not basically differ from those of the prior art, therefore the same reference numerals will be used for like portions in FIG. 1 and FIG. 2 and detailed description thereof will be omitted here.

The conductive paste of the embodiment is fabricated by dispersing a metal powder which is the conductive component and a glass frit with a low melting point in an organic vehicle. Ag powder can be suitably used as the metal powder. The sum of the Ag powder and the glass frit is about 60 to 90 w %, preferably about 80 wt %. The amount of the glass frit is about 4 to 10 w %, preferably about 6 wt %. The glass frit is a mixture of zinc frit and lead frit. The ratio of the zinc frit with respect to the entire glass frit is within the range of from about 20 to 80 wt %, with the lead frit being the remainder.

Further, a cellulose type resin can be used as the resin component of the organic vehicle and butyl carbitol can be used as the solvent component. Other vehicles and solvents can be employed. The compositions as shown in Table 1 were selected as the zinc frit and lead frit which compose the glass frit. Note that Frits 1 and 2 in Table 1 are zinc frit, while Frit 3 is a lead frit.

TABLE 1

| Frit No. | Components (wt %) | | | | | | | |
|---|---|---|---|---|---|---|---|---|
| | ZnO | $B_2O_3$ | $SiO_2$ | $Na_2O$ | CaO | $Al_2O_3$ | PbO | $Li_2O$ |
| 1 | 30 | 39 | 15 | 8 | — | 5 | — | 3 |
| 2 | 20 | 25 | 32 | — | 8 | 5 | — | 10 |
| 3 | 00 | 10 | 30 | 00 | 5 | 3 | 47 | 5 |

In this embodiment, the frits 1 to 3 shown in Table 1 are mixed based on the mixing ratios shown in Table 2 so as to form the glass frits of Samples 1 to 6. Note that Sample 4 in Table 2 is a glass frit used when forming a conductive paste along the lines of the prior art example, and is not within the scope of the present invention.

TABLE 2

| Sample | Frit Distribution Ratio (wt %) | | Flexibility Measurement |
|---|---|---|---|
| No. | Frits 1 & 2 | Frit 3 | (mm) |
| 1 | 1–30 | 70 | 4.1 |
| 2 | 1–50 | 50 | 3.9 |
| 3 | 1–70 | 30 | 3.7 |
| *4 | 1–100 | 0 | 1.8 |
| 5 | 2–30 | 70 | 4.2 |
| 6 | 2–70 | 30 | 3.7 |

Note: *indicates sample outside scope of the present invention

Next, by dispersing each of the glass frits of Samples 1 to 6 and Ag powder in predetermined amounts in the organic vehicle, various conductive pastes which include glass frits of differing mixing ratios are fabricated. Thereafter, the conductive pastes of each of Samples 1 to 6 are adhered to both ends of each of a number of prepared capacitor main bodies 13, i.e. capacitor main bodies 13 in each of which a dielectric ceramic layer 11 and internal electrodes 12 are alternately stacked and fired, by a technique such as dipping.

Further, after the adhered conductive pastes are dried and fired at a temperature of 770° C. or less, these are completed as capacitors 1 having the structure shown in FIG. 2. Subsequently, flexibility measurements for each of the capacitors 1 completed according to the sequence described above, and the measurement results listed in Table 2 were obtained.

More specifically, the capacitor according to Sample 4 which is outside the scope of the present invention shows the flexibility measurement of 1.8 mm, while the capacitors according to Samples 1 to 3, 5 and 6 which are within the scope of the present invention have flexibility measurements of at least 3.7 mm or more. These results reveal the great improvement in flexibility. Since it is preferable that an electronic product such as a capacitor has a flexibility measurement of 2 mm or more, the conductive paste of the present invention is suitably used for capacitors.

It is thought what makes the flexibility measurement increase is that in the case of external electrodes 2 comprising conductive paste including zinc frit, a reaction layer 15 (see FIG. 1) is not formed between the capacitor main body 13 and the external electrodes 2 which are formed simultaneously. According to experiments by the inventors of the present invention, it was confirmed that where the mixing ratio of the zinc frit in the glass frit is 20 wt % or less, the tensile strength of the external electrodes 2 is greatly reduced, and where it is 80 wt % or more, a reduction in the flexibility measurement could be seen. Therefore, it is preferable that the mixing ratio of the zinc frit be with the range of 20 to 80 wt %.

As has been explained above, one of the essential features of the present invention is to use a mixture of zinc frit and lead frit. A mixture of zinc frit and lead frit reveals both the characteristics of the zinc frit and the characteristics of the lead frit, separately. Specifically, in the case where the zinc frit has a lower softening point than that of the lead frit, softening the zinc frit promotes sintering of an electrode, and softening the lead frit suppresses the sintering. Thus, degree of the sintering of the electrode can be controlled by mixing two different frits. It is therefore thought that using a mixture of zinc frit and lead frit results in quite different effects from that obtained by using a single uniform glass frit includes zinc and lead in a form of one compound. The differences of the effects are explained by the following experiments.

Table 3 shows components of zinc lead borosilicate frit 4 which includes both zinc and lead in a form of a compound. The frit 4 is prepared by mixing zinc frit 1 and lead frit 3 in a ratio of 70:30 and fusing them so that zinc lead frit 4 having a uniform composition is obtained.

TABLE 3

| Frit | Components (wt %) | | | | | | | |
|---|---|---|---|---|---|---|---|---|
| No. | ZnO | B$_2$O$_3$ | SiO$_2$ | Na$_2$O | CaO | Al$_2$O$_3$ | PbO | Li$_2$O |
| 1 | 30 | 39 | 15 | 8 | — | 5 | — | 3 |
| 3 | — | 10 | 30 | — | 5 | 3 | 47 | 5 |
| 4 | 21.0 | 30.5 | 19.5 | 5.6 | 1.5 | 4.4 | 14.1 | 3.6 |

By using these frits, the conductive pastes identified as Samples 7 and 8 are prepared, respectively, in the same manner as explained above with reference to Tables 1 and 2. Thereafter, capacitors are fabricated so as to measure mechanical characteristics of the electrode according to Samples 7 and 8.

| Sample | Frit Mixing Ratio (wt %) | | | Flexibility | Tensile Strength |
|---|---|---|---|---|---|
| No. | Frit 1 | Frit 3 | Frit 4 | (mm) | (N) |
| 7 | 70 | 30 | — | 3.9 | 55 |
| *8 | — | — | 100 | 2.9 | 35 |

Note: *indicates sample outside scope of the present invention

As is shown in Table 4, Sample 7 includes the zinc frit 1 and lead frit 3 with the ratio of 70:30. Therefore, Samples 7 and 8 includes zinc and lead with the same ratio, that is, Samples 7 and 8 have the same composition as a whole. However, Sample 7 shows better mechanical characteristics than Sample 8. This is because Sample 7 includes two kinds of frits, i.e., zinc frit and lead frit, but Sample 8 includes only one kind of frit.

Although in the present invention a capacitor 1 has been taken as the electronic product having external electrodes, the present invention is not limited thereto and can naturally be applied to other electronic products such as ceramic resistors, etc.

What is claimed is:

1. A conductive paste comprising a silver or palladium metal powder and glass frit dispersed in an organic vehicle, wherein the glass frit is a mixture of a zinc containing frit and a lead containing frit, in which the zinc containing frit constitutes from about 20 to 80 wt % of the entire glass frit, and the lead containing frit is the remainder of the glass frit, wherein said zinc containing frit is a PbO-free zinc borosilicate glass and wherein said lead containing frit is a ZnO-free lead borosilicate glass.

2. A conductive paste according to claim 1, in which the zinc containing frit constitutes about 30 to 70 wt % of the entire glass frit.

3. An electronic part having an external electrode precursor thereon, wherein the external electrode precursor is a conductive paste comprising a silver or palladium metal powder and glass frit dispersed in an organics vehicle, wherein the glass frit is a mixture of a zinc containing frit and a lead containing frit in which the zinc containing frit constitutes from about 20 to 80 wt % of the entire glass frit, and the lead containing frit is the remainder of the glass frit, wherein said zinc containing frit is a PbO-free zinc borosilicate glass and wherein said lead containing frit is a ZnO-free lead borosilicate glass.

4. An electronic part according to claim 3, in which the zinc containing frit constitutes about 30 to 70 wt % of the entire glass frit.

5. An electronic part having an external electrode thereon in which the external electrode comprises a silver or palladium metal powder and a sintered glass frit, the glass frit before sintering being a mixture of a zinc containing frit and a lead containing frit in which the zinc containing frit constituted from about 20 to 80 wt % of the entire glass frit, wherein said zinc containing frit is a PbO-free zinc borosilicate glass and wherein said lead containing frit is a ZnO-free lead borosilicate glass.

6. An electronic part according to claim 5, in which the zinc containing frit before sintering constituted about 30 to 70 wt % of the entire glass frit.

* * * * *